United States Patent [19]

Ghahramani

[11] Patent Number: 5,808,908
[45] Date of Patent: Sep. 15, 1998

[54] METHOD FOR MEASURING THE USABILITY OF A SYSTEM

[75] Inventor: Bahador Ghahramani, Long Valley, N.J.

[73] Assignee: Lucent Technologies, Inc., Murray Hill, N.J.

[21] Appl. No.: 858,134

[22] Filed: May 19, 1997

Related U.S. Application Data

[63] Continuation of Ser. No. 251,079, May 31, 1994, abandoned.

[51] Int. Cl.$^6$ ....................................................... G09B 7/00
[52] U.S. Cl. ........................ 364/551.01; 705/10; 434/236; 434/322
[58] Field of Search ............................... 364/551.01, 554; 705/1, 7, 10; 434/236, 322, 323, 362, 363

[56] References Cited

U.S. PATENT DOCUMENTS

| | | | |
|---|---|---|---|
| 4,627,818 | 12/1986 | Von Fellenberg | 434/236 |
| 4,671,772 | 6/1987 | Slade et al. | 434/236 |
| 4,937,439 | 6/1990 | Wanninger et al. | 235/456 |
| 5,041,972 | 8/1991 | Frost | 364/401 |
| 5,084,819 | 1/1992 | Dewey et al. | 364/419.2 |
| 5,086,393 | 2/1992 | Kerr et al. | 364/419.2 |
| 5,496,175 | 3/1996 | Oyama et al. | 434/323 |

OTHER PUBLICATIONS

Friedman, "The Effects of Positive and Negative Wording on Response to a Likert Scale", Applied Marketing Research, vol. 28, Iss. 2, Fall 1988, pp. 17–22.
Flohrer, "Human Factors—Design of Usability", IEEE Proceedings: VLSI and Computer Peripherals, VLSI and Microelectronic Applications in Intelligent Peripherals and their Interconnection Networks, May 1989, pp. 2–108 to 2–113.
LaLomia et al., "Measurement of Computer Satisfaction, Literacy, and Aptitudes: A Review", International Journal of Human–Computer Interaction, vol. 2, No. 3, 1990, pp. 231–253.
Chin et al., "An Examination of the Relative Importance of Four Belief Constructs on the GSS Adoption Decision: A Comparison of Four Methods", IEEE 1993 Proceedings of the Intnl. Conf. on Systems Sciences, vol. 4, pp. 548–557.
Rao et al., "Towards a Texture Naming System: Identifying Relevant Dimensions of Texture", IEEE 1993 Proceedings Visualization, pp. 220–227.
Eberts, User Interface Design, 1994 Prentice–Hall Inc., pp. 61–81.
Designing Minimal Documentation Using a GOMS Model: A Usability Evaluation of an Engineering Approach, R. Gong et al., Sigchi Bulletin, Proceedings of the Chi'90, Empowering People, Seattle, U.S., vol. spec. issue, Apr. 1990 ISSN 0736–6906, U.S., pp. 99–106.
Measuring System Usability, R. Rengger, Proceedings of the 8th International Conference on Systems Engineering, 1991, U.K., pp. 713–720.

(List continued on next page.)

*Primary Examiner*—Emanuel T. Voeltz
*Assistant Examiner*—Eric W. Stamber

[57] ABSTRACT

A method for quantitatively and objectively measuring the usability of a system. The method provides quantitative measures for usability satisfaction, usability performance, and usability performance indicators. Usability satisfaction is measured by acquiring data from a system user population with respect to a set of critical factors that are identified for the system. Usability performance is measured by acquiring data for quantifying the statistical significance of the difference in the mean time for an Expert population to perform a task on a particular number of trials and the estimated mean time for a Novice population to perform the task on the same number of trials. The estimated mean time is calculated according to the Power Law of Practice. Usability Performance Indicators include Goal Achievement Indicators, Work Rate Usability Indicators, and Operability Indicators which are calculated according to one or more measurable parameters which include performance times, numbers of problems encountered, number of actions taken, time apportioned to problems, learning time, number of calls for assistance, and the number of unsolved problems.

18 Claims, 4 Drawing Sheets

OTHER PUBLICATIONS

Evaluating the Usability of Application Interfaces, C. Schneier, Proceedings of the International Conference on Systems, Man, and Cybernetics, Atlanta, U.S. Oct. 1986 IEEE, New York, U.S., pp.444–447, vol. 1.

Learning and Stability, G. Snoddy, Journal of Applied Psychology, vol. X, No. 1, 1926, U.S. pp. 1–36.

An Empirical Study of the Factors Which Affect User Satisfaction in Hospitals, J.E. Bailey et al., Industrial and Management Systems Engineering, Arizona State University, 1988.

Systems Usability Measurements Methodology, B. Ghahramani et al., Advances in Industrial Ergonomics and Safety V, Jul. 1993.

The Measurement of Meaning, C. Osgood, et al., University of Illinois Press, Urbana, Chicago, and London, 1967, pp. 25–30.

Measurement and Meaning of Job Satisfaction, J. P. Wanous et al., Journal of Applied Psychology 1972, vol. 56, No. 2, pp. 95–105.

FIG. 4

| CATEGORIES | CODES (S) | FACTORS |
|---|---|---|
| VISUAL CLARITY OF SCREENS: | 1 | SCREEN APPEARANCE |
|  | 2 | LAYOUT OF INFORMATION |
|  | 3 | USE OF COLOR* |
|  | 4 | USE OF HIGHLIGHTING* |
| FUNCTIONALITY OF SOFTWARE: | 5 | SCREEN ORGANIZATION |
|  | 6 | SOFTWARE EFFECTIVENESS |
|  | 7 | TASK ALLOCATION |
|  | 8 | SOFTWARE FLEXIBILITY |
|  | 9 | SYSTEM SPEED |
|  | 10 | SYSTEM RELIABILITY |
| EASE OF USE OF SOFTWARE: | 11 | USE OF COMMANDS |
|  | 12 | FAMILIARITY OF TERMINOLOGY |
|  | 13 | TERMINOLOGY THROUGHOUT THE SYSTEM |
|  | 14 | ICON RELEVANCE* |
|  | 15 | ERROR RECOVERY |
|  | 16 | FEEDBACK |
|  | 17 | LOCATION ACCESS |
|  | 18 | DEMAND ON MEMORY |
| SYSTEM MESSAGES AND HELP: | 19 | MESSAGES TO RECOVER FROM ERRORS |
|  | 20 | MESSAGES TO PREVENT DELETION/ERRORS |
|  | 21 | SYSTEM INSTRUCTIONS |
|  | 22 | USER GUIDE* |
|  | 23 | HYPERTEXT* |
|  | 24 | JOB AID(S)* |
| SYSTEM TRAINING: | 25 | TRAINING GUIDE* |
|  | 26 | INSTRUCTOR* |
|  | 27 | COMPUTER-BASED TRAINING* |
| SYSTEM OUTPUT: | 28 | COMPLETENESS |
|  | 29 | LAYOUT |
|  | 30 | TIMELINESS |
| WORK ENVIRONMENT: | 31 | KEYBOARD DESIGN |
|  | 32 | WORKSTATION SET-UP |
|  | 33 | MOVEMENT RESTRICTION |
|  | 34 | FATIGUE |
|  | 35 | SOUND DISTRACTION |
|  | 36 | EYE STRAIN |

*SYSTEM SPECIFIC

METHOD FOR MEASURING THE USABILITY OF A SYSTEM

This is a continuation of application Ser. No. 80/251,079, filed on May 31, 1994 abandoned.

TECHNICAL FIELD

The present invention relates generally to engineering, ergonomics, reliability, and information systems, and more particularly, to a quantitative method for measuring the usability of a system or product.

BACKGROUND OF THE INVENTION

Customers determine the quality of a system. Typically quality is thought of in terms of well built, long-lasting or defect free. While these are critical components of quality, it is important to realize that if a customer considers a product difficult to use, the customer is not likely to use it enough to find out how well built it is. In instances where customers are internal, and may not have the choice of using a system or not, there are still many reasons for making the system as usable as possible. A term that is often used to describe the quality of a product from the user's perspective, and is especially common with respect to computer products, is the term "user friendly."

A broader term that may be used to describe a system or product is "usability." A usability method, as defined herein, is a method for quantifying user interaction with a system. Typically, the terms "user friendliness", "ease of use" and "ease of learning" are used to qualitatively describe usability; however, it is emphasized that usability, as used herein, is based in quantitative and objective measurement. Usability, then, refers to a comprehensive, quantitative, and objective assessment of all the aspects of system or product performance measurements that can determine and represent how well a product performs for users.

Heretofore, there has been no quantitative and objective method for measuring the usability of a system. For instance, with many software products, (e.g., such as different word processing programs), the "user friendliness" is described in terms of the "look and feel" of the user interface, the "intuitiveness" of performing certain functions, the logical organization of pull-down menus, etc. In contrast, quantitative "benchmark" tests are used to measure processing power; for example, by measuring the time to complete various tasks using different software products (e.g., word processing, graphics, spreadsheets, databases) that emphasize different processing functions (e.g., floating point operations, integer operations, etc.). These benchmark tests, however, focus on processing power, and not on usability. A further example of such prior art attempts at assessing usability is the use of psychological "one-way mirror" observations of user interaction with a developed product or system. Moreover, techniques for assessing a system have been applied only after a system has been developed or put into the field. Clearly, it would be efficacious to provide quantitative and objective usability measurements before and during product development—not only after completion.

Such a usability method should provide many new and useful means for enhancing usability itself, and "high" usability translates directly into cost, quality, performance, and satisfaction benefits. Of course, there is a perception that quality always costs more. In fact, while producing a quality product may require additional investments initially, invariably costs are reduced over the long term. Usability improvements quickly lead to cost savings in several key areas. Improvements resulting from usability measurements will help increase customer and user satisfaction, reduce errors, and increase user productivity. Simply stated, many cost, quality, and satisfaction benefits can be expected by performing usability assessment, and making product modifications to improve areas of weakness.

With respect to cost, testing a system's usability in the prototype stage highlights areas requiring improvement prior to full scale development. Fewer resources are required to make improvements during the prototype stage than further along in the development cycle. Also, quantitative and objective measurements of usability are more efficiently translated into re-engineering efforts by engineers and designers, in contrast to the necessarily more vague qualitative analyses (e.g., psychological studies). In addition, highly usable products are much more intuitive, and therefore require a lower investment in training development and delivery. Operators of usable systems will become experts more quickly than with difficult to use systems. Further, critical and frequently performed tasks are given extra attention during usability testing to ensure that errors are as low as possible, and that the tasks are performed as efficiently as possible. Moreover, a quantitative measurement of efficiency of use can determine areas where user interaction with a system should be made more efficient.

With respect to quality, usability testing isolates error prone tasks and activities so that they can be improved. Based on usability measurements, Human Factors Engineering techniques can be used to focus on error prevention techniques in addition to the standard methods of error detection. In addition, usability tests track the ability of system users to remember and process particular commands. By reducing the need for users to memorize and process information to perform particular functions, overall errors are reduced. Moreover, systems which are highly consistent and compatible with existing products allow users to transfer skills they have already developed to perform system functions and solve problems. Compatible systems operate according to the same rules as other familiar systems. Operation of the system should also feel natural to users.

Concomitant with cost and quality benefits, customer satisfaction is increased as well by reducing errors, reducing cost, and increasing user productivity. Moreover, system user satisfaction is increased by making the system easier to use, making ergonomic improvements, increasing system flexibility to meet varying user needs and user preference, and making the system more enjoyable to use.

Increasing a system's usability will lower cost by reducing errors and reducing required training time, and will increase efficiency, productivity, quality and user satisfaction. Usability measurement provides a process for objectively and quantitatively measuring the usability of existing systems, and to assist possible re-engineering efforts.

It is understood then, that a quantitative and objective usability methodology has potentially vast utility. Nevertheless, the prior art is devoid of a usability method that provides objective and quantitative information that may be used to exploit such potential.

SUMMARY OF THE INVENTION

The present invention overcomes the above, and other, limitations of prior art usability techniques by providing a usability method that provides objective and quantitative measurement of a system, and thus provides many features and advantages heretofore unrealizable. In an embodiment of the usability method according to the present invention, three methods for measuring and quantifying usability are included: a Usability Satisfaction Method, a Usability Performance Method, and a Usability Performance Indicators Method.

Measuring usability satisfaction includes: identifying critical factors, developing a survey with respect to the critical factors, each critical factor associated with at least one bipolar adjective pair, each bipolar adjective pair associated with a range of numerical values; acquiring user responses to the survey; and calculating usability satisfaction values according to critical factors and to users. For instance, an individual user's overall satisfaction may be represented as a weighted sum over all critical factors. Further, individual user's overall satisfaction may be averaged over all users, thus providing an average overall satisfaction. Alternatively, usability satisfaction for a particular critical factor may be quantified. That is, each user's satisfaction for a given critical factor may be averaged over all users.

Measuring usability performance includes: measuring the time for each member of a population of Experts to perform a task for each of a plurality of trials; measuring the time for a population of Novices with perform the same task; comparing the mean time for the population of Novices to the mean time for the population of Experts for a predetermined trial number in order to obtain a statistical index indicative of the significance of the difference between the means. In accordance with a preferred embodiment of the present invention, applying the Power Law of Practice enables measuring the Novice population performance time for only a first trial and estimating the mean performance time for the Novice users for a predetermined subsequent trial number. Preferably, the predetermined trial number corresponds to a trial number for which the Expert population performance time is measured.

The methodology for providing performance indicators includes generating Goal Achievement Indicators, Work Rate Usability Indicators, and Operability Indicators according to measurable parameters including performance times, numbers of problems encountered, number of actions taken, time apportioned to problems, learning time, number of calls for assistance, and the number of unsolved problems.

Many features and advantages of the present invention will become apparent by practicing the invention.

A feature of the usability model is that it is quantitative in nature, a departure from existing usability measurements methodologies which are qualitative. The mathematical methods incorporated into the usability model provide a consistent method for quantifying results collected from survey and test results.

Another feature of the present invention is that it provides a consistent and repeatable measurement of usability. Users with similar skills, training and background pertaining to a specific system should measure usability of the system similarly using the model. The results should be identical, independent of the time of test. Simply stated, similar users should come up with similar usability results for the same system, and their answers should be identical to measurements taken at various time intervals.

Yet another feature of the Usability Model is that it provides cost effectiveness. The Usability Model can be viewed as a measurement that identifies resources deployed to make a system work. The model provides specific information that will help analysts increase the quality of the outputs (benefits) or reduce the resources (costs) needed to deploy. The benefits are based on a continuum from resource reduction to work enhancement. The model also highlights the means to achieve higher productivity from existing resources. Thus, a group of system users can be expected to produce more outputs when usability of a system is improved.

Yet a further feature of the present invention is that it can be used across platforms. By adjusting the critical factors, and selecting appropriate tasks, the model can be adapted to assess the usability of any product. This entails hardware, software and environment.

Still another feature of the present invention is that the usability method produces consistent results which are easy to validate by comparing different tests.

Still a further aspect of the present invention is that it is adaptable; any aspect of a system can be addressed by including critical factors relevant to that aspect. Adjustable critical factors allow the usability model to provide the flexibility and coverage required by teams testing a system's usability. The usability model highlights the problem areas of a system, and produces results which will help define corrective measures to be taken.

These and other features and advantages will be apparent from the following description, together with the accompanying drawings and appended claims, as well as from practicing the invention accordingly.

BRIEF DESCRIPTION OF THE DRAWINGS

The invention will be described in greater detail below by way of reference to the accompanying drawings, wherein:

FIG. 4 illustrates thirty-six possible critical factors, subdivided by category, for a management information system, in accordance with an embodiment of the present invention.

DETAILED DESCRIPTION OF THE PREFERRED EMBODIMENT

Figure 1:
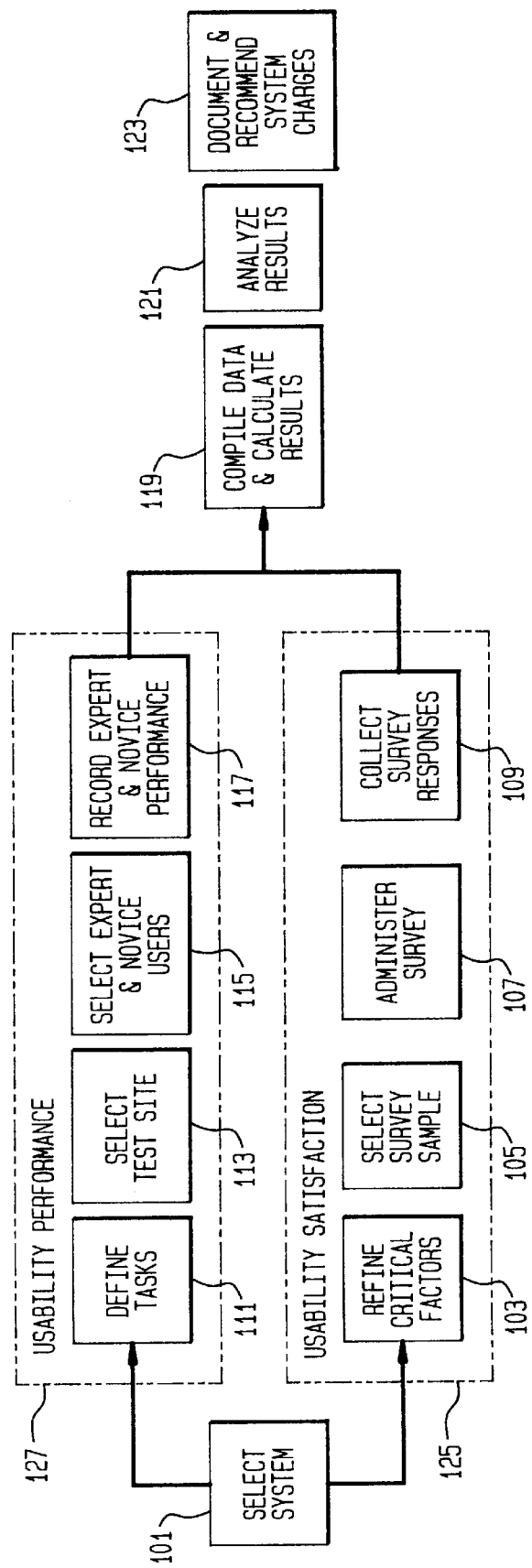
FIG. 1 shows a flowchart for implementing the usability model in accordance with the present invention.

The usability measurement method of the present invention (hereinafter "usability model" or "usability method") provides a means of quantitatively measuring product or service systems with respect to user satisfaction and performance. When applied, the methods of the usability model produce output which point out areas needing improvement, and user desired features that should be added. Applications for this model are broad and particularly effective in the area of products and services, e.g., manufacturing, marketing, finance, product development, and information systems.

The present invention, therefore, will benefit the design, development and operation of present or future products and services systems. Although the focus of the examples herein described are primarily on information systems, the model is applicable for all types of systems. As used herein, the terms "system" and "product" are used to represent any entity that would benefit from the usability model of the present invention. A system is a product or service of any type that a customer or client will use. It does not strictly refer to computer or information systems. A system or product may be intended for either external or internal customers.

It is imperative to emphasize that the usability model of the present invention is applicable for measuring the usability of all types of systems: computer, as well as any other initiative that produces products or services. The usability of any product can be measured using the usability model. The usability model incorporates users' perceptions of a system and their experiences with its operation. It addresses all aspects of existing systems, including hardware, software, and environment. Usability measurement is more interested in user satisfaction with a system rather than evaluation of its design and development specifications, e.g., Systems Engineering, Electrical & Electronics Engineering, Mechanical Engineering, etc.

Generally, the usability of a system is a combination of its' social acceptability and application acceptability. The usability model emphasizes evaluation of the application acceptability of a system. Application acceptability is directly related to factors such as reliability, timeliness, and usefulness.

In accordance with a preferred embodiment of the present invention, the usability model may be viewed as consisting of three methods: a Usability Satisfaction Method, a Usability Performance Method, and a Usability Performance Indicators Method. These three methods supplement each other, providing a thorough assessment of usability from the user's perspective. It will be further understood, however, that the usability model of the present invention may be subject to many variations without changing the scope of the invention or diminishing its attendant advantages. One of these variations, is that the usability model may, for example, not necessarily include the Usability Performance Indicators Method; nevertheless, the usability model will provide numerous features and advantages.

The ensuing methodology overview further describes each method, which are then described in further detail. Any cited references are hereby incorporated by reference. In addition, in connection with the detailed description examples are presented to illustrate features and characteristics of the present invention, and to elucidate implementation of the usability model; such examples are not to be construed as limiting the invention thereto. Also, it is noted that although the methodology is broadly applicable to myriad systems, in an embodiment of the present invention in which a system is an information system (e.g., based on a computing system), all acquisition of data may occur via the information system, including measurement of time intervals, number of steps completed, etc., as will be further understood hereinbelow.

Methodology

To assess a system's usability satisfaction, a set of critical factors are defined. Critical factors are those components which influence a user's ability to efficiently and effectively operate a system. Once defined, the factors are used to develop a survey which is to be completed by system users.

Usability satisfaction measurement is the weighted sum of an individual's perception or attitude toward all critical factors influencing a particular task or job function (Wanous J., and Lawler E., 1972, Measurement and Meaning of Job Satisfaction. *Journal of Applied Psychology*, 56:95–105).

The results of the survey are used to calculate usability satisfaction by critical factor(s) and by user(s).

As an example, suggested critical factors for a simple computer system have been separated into five categories, including: the visual clarity of screens, the functionality of software, the ease of use of software, the system training, and the system messages and help.

It is important to note that different products have to be tested based on their own unique set of critical factors. Since a product is considered unique and evaluated apart from other products, a set of critical factors applicable to one will vary from the sets of critical factors applied to other products.

The Usability Performance Method is based on the ergonomics of Human-Machine System principles. These principles analyze the Perceptual, Cognitive and Motor Skills of an individual operating a system. In this model a series of tasks are selected for testing. A task is defined as either a single operation (e.g., using a function key F1, or Alt), or a series of operations. The model enables quantitative measurement of the usability of a system based on the time required to perform selected tasks. Preferably, the Usability Performance Method applies what is known as the Power Law of Practice method (Snoddy, G. S., 1926, Learning and Stability, *Journal of Applied Psychology*, 10, 1–36), and statistical analysis to produce an overall index of performance usability that is objective and does not rely on measuring a learning curve.

A Usability Performance Indicators Method or model is used to quantify system performance in several key areas. Preferably, this Usability Performance Indicators Method provides usability performance indicators directed to different aspects and issues in usability, and includes: Goal Achievement Usability Indicators, Work Rate Usability Indicators, and Operability Indicators. These indicators primarily measure the level of system users performance, e.g., effectiveness, efficiency, productivity, ability, willingness.

More particularly, Goal Achievement Usability Indicators measure the degree of success with which systems users perform their tasks and reach their goals. They measure the effectiveness of users operating systems and achieving their objectives. In contrast, Work Rate Usability Indicators measure the rate at which system users perform to reach their objectives. They measure the efficiency and productivity of users operating to perform their tasks. Operability Indicators measure the ability of system users to utilize the system features. They measure the capabilities of systems users in making use of their experience, tools, and features to solve their systems problems. They also measure the level of problems users encounter while performing their jobs.

Applying the usability model involves gathering users' perceptions of a system, and conducting performance tests using a selected set of tasks. Referring to FIG. 1, the primary steps involved in applying the usability model of the present invention may be outlined.

First, in step 101, a system is selected. As discussed hereinabove, a "system" is not limited to computer systems, but broadly spans any product, system, service, or any facility with which a user interacts to accomplish a goal or a task in accordance with means provided by the system.

Once a system is selected, in order to apply the Usability Satisfaction Method, a usability satisfaction information acquisition sequence 125 is performed, the first step 103 of which includes, as described hereinabove, defining and refining a set of critical factors and a survey based on the critical factors. Then, users to be surveyed are selected and the survey is administered in step 105 and step 107, respectively, followed by collection of the survey responses in step 109.

In order to apply the Usability Performance Method, a usability performance data acquisition sequence 127 is performed. First, a set of tasks must be defined (step 111). Then, in step 113, an appropriate test site is selected according to the task requirements and to the desired experimental conditions. The Usability Performance Method of the present invention uses both Expert and Novice users, who are selected in step 115. For purposes of the Usability Performance Method, Expert users are those individuals who can use a system, product or service competently, whereas Novice users are those users who have no familiarity therewith. Novice users, however, undergo a brief training or familiarization process before actual testing occurs in step 117, in which the Expert and Novice user performance of one or more tasks is recorded.

In step 119, the data that is collected and recorded in step 109 and step 117 are compiled, and the appropriate calculations are performed to calculate and elucidate usability performance and usability satisfaction in a quantitative and objective manner. The resulting quantitative information is analyzed (step 121), and recommendations for changes in the system are made accordingly (step 123).

It is understood that FIG. 1, which schematically depicts the steps involved in graphic format, is merely illustrative, and is susceptible to many modifications and adaptations. Note that usability satisfaction and usability performance data can be collected concurrently. Also note that the Usability Performance Indicators Methodology is not explicitly shown in FIG. 1, but is generally included as part of the data compilation and calculation step (i.e., step 119), although as will be further understood below, deriving certain performance indicators may preferably require additional measurements and data acquisition.

The foregoing methodology discussion broadly presents the three models or methods that preferably comprise the usability model of the present invention. The features and advantages of the usability model may further be appreciated in accordance with the ensuing description of preferred embodiments for the Usability Satisfaction Method, the Usability Performance Method, and the Usability Performance Indicators Method.

Usability Satisfaction Method

A preferred method of reliable usability satisfaction measurements is the weighted sum of an individual's perception or attitude toward all critical factors influencing a particular task or job function (See supra, Wanous, 1972). Applying this definition of usability measurement, for testing, validating, and otherwise applying the usability model, it is necessary to gather a sample of critical factors for a system. Identifying the critical factors to measure usability of systems is based on determining the critical factors influencing users' abilities to efficiently and effectively operate the system under study. As an example, after careful evaluation of all pertinent factors, using a sample management information system as an example, thirty-six critical factors were identified, and are tabulated in FIG. 4. These factors are the primary basis of measuring usability of this sample computer system. For better statistical analysis of the results, these factors are further divided into four categories: visual clarity of screens, functionality of software, ease of use of software, system messages and help, and system training. Each category indicates an important aspect of the users satisfaction toward the system.

In accordance with an embodiment of the present invention, a preferable, and widely accepted method of measuring users perception or attitude toward a system is the Semantic Differential Technique. This technique was originally developed to measure the meaning of complex concepts (Osgood, C. E., Suci, G. J., and Tannenhaum, P. H., 1957, The Measurement of Meaning, In: *University of Illinois Press*, Urbana, Ill.). The Semantic Differential Technique focuses on appropriate pairs of bipolar adjective pairs for each of the Critical Factors, e.g., "On" and "Off", "Efficient" and "Inefficient", "Good" and "Bad". These adjectives are then divided into a seven interval scale. Each of the seven intervals of the scale is further labeled with intensity modifiers.

Figure 2:
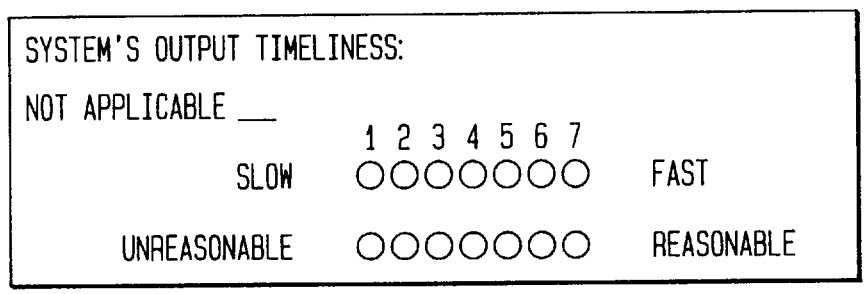
FIG. 2 illustrates two bipolar adjective pairs for a critical factor for an information system, in accordance with the present invention.

Adhering to the Semantic Differential Technique, in the example provided, each of the thirty-six critical factors were assigned adjective pairs. An example of bipolar scales measuring "SYSTEM'S OUTPUT TIMELINESS" is shown in FIG. 2. It can be seen from this example that a critical factor may include more than one adjective pair (e.g., two adjective pairs, Fast/Slow and Reasonable/Unreasonable). Further, it is understood that each critical factor may have a different number of bipolar adjective pairs System users are asked to mark the applicability of each question. If the Not Applicable answer is marked, then the user does not mark the bipolar adjectives for that question. If the factor is applicable then the user will continue marking the seven interval scales. To quantitatively measure usability of a system, when applying the usability satisfaction algorithm, each of the seven interval scales will be assigned a numeric value from –3 (for the first scale) to +3 (for the seventh scale).

Figure 3:
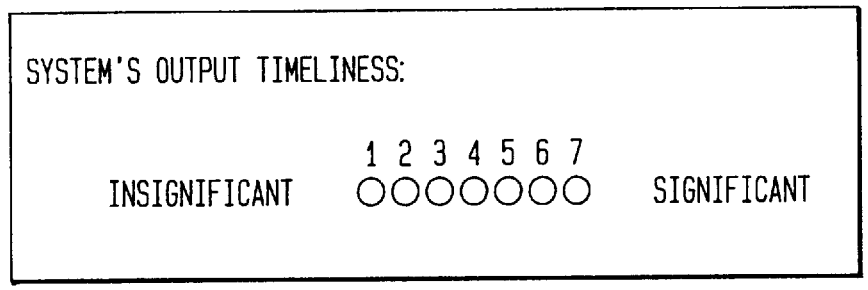
FIG. 3 illustrates an example of a significance scale for a critical factor in order to assist acquiring significance information, in accordance with the present invention.

Preferably, there is another scale which measures significance of each critical factor to the users, which ranges from extremely unimportant to extremely important. This significance scale is assigned corresponding values from 0 to 1.0. An example of a significance scale for a factor to a user is shown in FIG. 3. In practicing the Usability Satisfaction Method, then, each identified system user will receive a package consisting of instructions for completing the questionnaire, and the questionnaire. The questionnaire preferably includes for each critical factor: a significance scale, at least one adjective pair scale, and an entry for marking "Not Applicable." For results to be valid and accurate, users should be selected randomly, and a statistically significant sample size should be used. In addition, these users must have enough knowledge of the system being studied to answer the questionnaire.

It is important to note that, if a user chooses the "Not Applicable" answer for a bipolar adjective pair, the user is given the opportunity to respond to its corresponding significance question. This is due to the fact that a Critical Factor may not be applicable to a group of users, but may still be important to them.

The seven interval significance scales are defined in Table 1.

TABLE 1

Users Significance Scale

| Scales: | Degree of Significance: |
|---|---|
| 1 | Extremely Significant |
| 2 | Quite Significant |
| 3 | Slightly Significant |

TABLE 1-continued

Users Significance Scale

| Scales: | Degree of Significance: |
| --- | --- |
| 4 | Equally Significant or Insignificant |
| 5 | Slightly Insignificant |
| 6 | Quite Insignificant |
| 7 | Extremely Insignificant |

Usability of a system consists of the sum of its users' feelings or users degree of satisfaction toward the system. Therefore, usability of a system is measured as the sum of users feelings arising from products and services being provided by the system (Bailey, J. E., and Rollier, D. A., 1988, An Empirical Study of the Factors Which Affect User Satisfaction in Hospitals, *Proceedings of the Twelfth Annual Symposium on Computer Applications in Medical Care*).

The following usability satisfaction measurement model governs and reflects this principle.

$$U(i) = \sum_{j=1}^{J} \left[ S(i,j) * \frac{1}{K_j} \sum_{k=1}^{K_j} A(i,j,k) \right] \quad (1)$$

$$U(j) = \sum_{i=1}^{I} \left[ S(i,j) * \frac{1}{K_j} \sum_{k=1}^{K_j} A(i,j,k) \right] \quad (2)$$

Where:
i=User i
j=Critical Factor j
k=Adjective Pair k
I=Number of users being tested using a system
J=Number of critical factors
$K_j$=Number of adjective pairs used for critical factor j ($K_j$>0)
U(i)=User i satisfaction
U(j)=Critical factor j satisfaction
S(i,j)=Importance value of factor j for user i
A(i,j,k)=Answer of user i for adjective pair k of factor j That is, in order to measure a given user's satisfaction, a weighted sum over the responses to all critical factors is performed for that user. Specifically, for each critical factor j, the importance value is multiplied by the sum of the adjective pair response values for that critical factor, resulting in a user satisfaction value for each critical factor j. To obtain an overall user satisfaction for this given user, then, the user satisfaction values for each critical factor j are summed (i.e., sum over j).

It is also understood that U(j) represents the user satisfaction for critical factor j. That is, U(j) is a weighted sum over the responses for all users for a given critical factor j. It is understood that U(i) and U(j) are only representative of the ways in which the acquired information may be quantitatively represented as a usability satisfaction measure. As discussed above, the critical factors may be grouped into categories (e.g., functionality of software, visual clarity of screens, etc.). Thus, it may be understood that usability satisfaction may be calculated for each category by appropriately summing over the critical factors within an identified category. Similarly, users may be grouped into different categories or types of users, and sums over users within these categories may be performed; for example, either sums of U(i) over a set of users, or a restricted sum over i to calculate a restricted U(j). It is also recognized that an overall usability satisfaction value may be obtained by summing U(i) over all users i, or equivalently, by summing U(j) over all critical factors j. It can be appreciated that in order to facilitate analysis and comparison of the Usability Satisfaction Method output, one skilled in the art may appropriately normalize the various quantities that may be calculated in accordance with the Usability Satisfaction Method of the present invention.

For instance, occasionally, a critical factor is only significant to a few users. Similarly, a given user may not consider all critical factors significant. In such cases, normalization assists analysis of the results for this group of a few users to whom the critical factor is significant. To normalize the results, the data can be normalized within a range of −100 to +100 according to the following formulas:

$$NU(i)=100*U(i)/(3*NF(i)) \quad (3)$$

$$NU(j)=100*U(j)/(3*NF(j)) \quad (4)$$

Where:
NU(i)=Normalized significance of user i
NU(j)=Normalized significance for factor j
NF(i)=Number of factors user i considers applicable
NF(j)=Number of users considering factor j applicable It is understood that in accordance with the Usability Satisfaction Method, the usability of a system pertaining to a critical factor is evaluated by the position of its users on a continuum between a "worst state" and a "best state" for that factor. Therefore, accuracy and objectivity of this model greatly depends on careful delineation of the critical factors comprising the domain of the users satisfaction toward a system.

It is imperative to note that, the Usability Satisfaction Method of the present invention emphasizes a mathematical representation of the relationship between a system and its users. This relationship directly relates to all services and products provided by the system. This relationship is also influenced by policies and other informal rules and regulations governing a system.

As an example of implementing the Usability Satisfaction Method, statistical analysis of each of the categories of critical factors may preferably be presented in a tabular form. For example, the presentation of the Usability Satisfaction Method results may consist of the following format.

| Visual Clarity of Screens: | MIN | AVER | MEDIAN | RANGE |
| --- | --- | --- | --- | --- |
| Appearance of Screen | | | | |
| Layout of Info. | | | | |
| Use of Color | | | | |
| Use of Lighting | | | | |

In this table, each entry contains the appropriately normalized value for the usability satisfaction for a category of critical factors, or a critical factor. For example, for the "use of color" critical factor, the minimum value calculated for a given user, the average over all users (i.e., normalized U(j)), the median, and the range are presented. It can be understood, then, that the table clearly represents the quantitative data from the Usability Satisfaction Method such that each critical factor may be analyzed and thus, weaknesses in the system may be quantitatively identified and corrected accordingly. In accordance with the discussion above, a table of all the critical factors may also be included further entries for overall satisfaction, and user satisfaction by categories based on the critical factors and/or users. It is also understood that such a tabular format is merely illustrative of the many ways the quantitative data may be represented, and is not limiting of the Usability Satisfaction Method of the present invention. For instance, graphical representation (e.g., histograms) may be useful. Also, statistical measures of the distribution (e.g., standard deviation) may also be useful.

Usability Performance Method

In accordance with the present invention, a preferred Usability Performance Method (or model) is based on the ergonomics of Human-Machine System principles. These principles analyze the perceptual, cognitive and motor skills of an individual operating a system. According to these principles, a system user's mind operates as an information-processing system and consists of: memories, processors, parameters, and supporting hardware and software. The Usability Performance Model measures the usability performance of a system based on the interaction and interdependency of three primary subsystem: the Perceptual System, the Cognitive System, and the Motor System.

In the Human-Machine System, the Perceptual System receives signals from sensors and related buffer memories. Visual Image Memory is the most significant buffer and is capable of storing important memories and keeping them in a Visual Image Database and an Auditory Image Database.

These two databases maintain the output of the Human-Machine sensory while it is being symbolically coded in the brain. To accurately and quantitatively measure usability of a system, Visual Image Memory characteristics must be realized and analyzed.

Through the Perceptual System, the Human-Machine System detects sensations (activated by the Sensory System) from the environment and transmits them to the human brain. As an example, an end user's Visual System operating a Human-Machine System activates the retina of the eyes which is sensitive to light, and registers information from the physical world in the brain.

In the Human-Machine System, the Cognitive System receives the symbolically coded information from the Visual Image Memory Sensors and inputs information onto its Working Memory Processor and activates the users previously stored data from the Visual Image Database, and the Auditory Image Database in the Long-Term Memory Processor to actively make decision about how to properly respond.

The Cognitive System simply uses the information maintained in the brain, which was received through the Perceptual System to decide the best possible alternative (decision).

In the Human-Machine System, the Motor System receives the decision from the Cognitive System and carries out the response. Therefore, the decision received from the Cognitive System will be used to activate the Motor System and stimulates a response.

The following mathematical methodology is based on the ergonomics of the Human-Machine System principles which analyzes the Perceptual, Cognitive and Motor Skills of an individual operating a system, and Power Law of Practice (See supra, Snoddy). In this methodology a task is defined as either a single operation (e.g., using a function key F1, or Alt), or a series of operations. As will be further understood hereinbelow, implementing this methodology enables quantitative measurement of the usability of a system's task based on the performance time of a user.

In order to apply the Power Law of Practice, it is critical to clearly define, identify and document the task to be measured as well as the necessary steps a Novice user must follow to successfully complete the task. According to the Power Law of Practice, the time T(i,j) a user takes to perform a task on the jth trial is measured as:

$$T(i,j) = T(i,l)*(j)^{-\alpha} \quad i=1,2,\ldots I \quad (5)$$

$$\overline{T}(i,j) = \overline{T}(i,l)*(j)^{-\alpha} \quad j=1,2,\ldots J \quad (6)$$

For "I" users, and after "J" trials:

$$\overline{T}(i,j) = \sum_{i=1}^{I} \frac{T(i,j)}{I} \quad (7)$$

$$\overline{T}(i,1) = \sum_{i=1}^{I} \frac{T(i,1)}{I} \quad (8)$$

Simplifying the exponential equation (6):

$$\text{Log } \overline{T}(i,j) = \text{Log } \overline{T}(i,1) - \alpha \text{ Log } j \quad (9)$$

$$\alpha = \frac{\text{Log } \overline{T}(i,1) - \text{Log } \overline{T}(i,j)}{\text{Log } j} \quad (10)$$

Where:
 i=ith user
 j=jth trial
 α=Constant
 I=Total number of users performing a task
 J=Total number of trials
 T(i,j)=Performance time of the ith user performing a task for the jth trial
 T(i, 1)=Performance time of the ith user performing a task for the 1st trial
 $\overline{T}$(ij)=Mean or average performance time of "I" users performing a task for the jth trial
 $\overline{T}$(i, 1)=Mean or average performance time of "I" users performing a task for the 1st trial It is understood that the Power Law of Practice methodology indicates that as a task is repeated, the amount of time required to complete the task is inversely proportional to a power of the number of trials. That is, once the exponent term α is determined, then the amount of time required for a future task may be estimated according to the Power Law of Practice. Further, the Power Law of Practice , if the exponent term α is known for a certain task performed by a particular subject (or by a population of subjects), then the amount of time required for another subject (or the average time for a population of subjects) to perform the task on the jth trial may be calculated according to the Power Law of Practice, using only a measurement of the time required for the latter subject (or population of subjects) to perform a first trial. In accordance with a preferred embodiment of the present invention, usability performance is quantitatively measured according to the statistical significance (e.g., degree of confidence) of the difference between the mean jth trial task completion time for an Expert population and for a Novice population, whereby the mean jth trial task completion time for the Novice user population is calculated according to the Power Law of Practice, using the exponent α value determined from measuring the trial task completion time of the Expert population for a plurality of trials.

Figure 5:
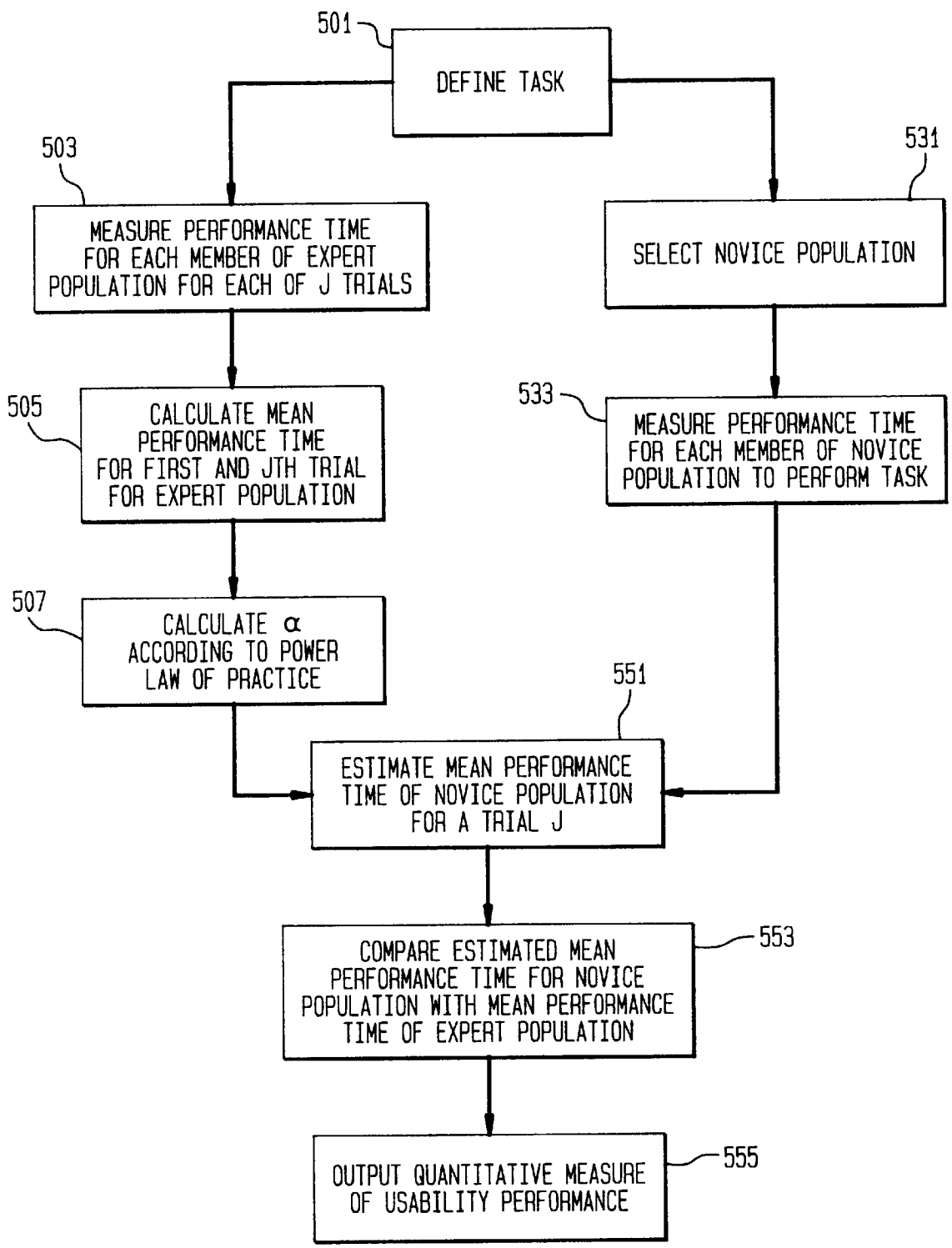
FIG. 5 is an operational flowchart of an exemplary process for implementing a usability performance measurement, in accordance with an embodiment of the present invention.

Referring to the flowchart of FIG. 5, an embodiment of the Usability Performance Method proceeds as described hereinbelow. It is emphasized that the example provided in connection with the description of this method is merely illustrative, for purposes of clarity, and is not limiting of the inventive method. For instance, although specific sample sizes are used in the example, it is understood that the sample sizes used in practice may vary considerably.

First, in step 501, the task (or tasks) to be measured are determined. Then, a number (e.g., 5 to 10) of experienced and well trained users (i.e., Experts) are selected to perform the task for a number of trials (e.g., 5 to 10 trials), and the completion time of the first trial T(i, 1), and the jth trial T(i,j) are accurately recorded (step 503) for each Expert user. It is understood that the completion time of each trial may be recorded, but in accordance with an embodiment of the present invention, the completion time for only two trials (i.e., T(i, 1) and T(i,j) for a predetermined value of j) is required.

In step 505, the corresponding average completion time for the first and jth trials (i.e., $\overline{T}(i, 1)$ and $\overline{T}(i,j)$) for the Expert users are calculated. Then, using equation (9) these average completion time values are used to determine the constant α for the Expert users (step 507). In accordance with the Usability Performance Method, in step 531, a number (e.g., 9) of Novice users are randomly selected. These Novice users are familiarized with the system, and in step 533, are asked to perform the task for the first time, and their respective performance times are carefully recorded.

Next, in step 551, the average first trial performance time for the Novice user population is calculated. Then, using the constant α that was computed for the Expert users in step 507 and equation (6), the average value of the performance time for the jth trial may be estimated for the Novice users (i.e., $\overline{T}(i,j)$). Alternatively and equivalently, using equation (5) and computed constant α, T(i,j) for each Novice user may be calculated, and then these individual T(i,j) values may be averaged.

In accordance with the present invention, in order to provide a quantitative representation of usability performance, a statistical analysis is performed to compare the performance time of Expert users to that of Novice users. In a preferred embodiment, the estimated mean performance time of Novice users for the jth trial, calculated according to the Power Law of Practice, is statistically analyzed with respect to the measured mean performance time of Expert users for the jth trial. Preferably, statistical inference or hypothesis testing is used according to the Student t-Distribution.

Accordingly, in step 553, hypothesis testing of the model quantitatively and statistically compares the data obtained from Expert, and Novice users. Hypothesis testing may be performed by positing the hypothesis that the mean values of the performance time for the jth trial are equal for the Expert and Novice user populations. That is:

$$H(0): \overline{T}_E(i,j) = \overline{T}_N(i,j) \quad (11)$$

The alternative hypothesis may then be stated as:

$$H(1): \overline{T}_E(i,j) \neq \overline{T}_N(i,j) \quad (12)$$

Where:

$\overline{T}_E(i,j)$=The mean performance time of the jth trial for the Expert user population.

$\overline{T}_N(i,j)$=The estimated mean performance time of the jth trial for the Novice user population.

H(0)=Null hypothesis

H(1)=Alternative Hypothesis

The probability of rejecting or accepting a true H(0) hypothesis is based on b% significance level of acceptance. It is this significance level which quantitatively reflects the usability performance of a system. For example, assume that one wishes to know whether the hypothesis is acceptable for a b=5% significance level. This inquiry means that b=0.05 or b/2=0.025 for the two rejection sides (tails) of the t-Distribution, and thus implies that the t values of the two rejection areas for an example where there are twelve degrees of freedom are delineated by the values +2.18, and −2.18 (obtained from the t Probability Distribution Table). It is noted that, as known in the art, the number of degrees of freedom for a population is equal to one less than the number of elements in the population, and that the number of degrees of freedom for the comparison of two populations is equal to the sum of the degrees of freedom for each population.

In accordance with the t-Distribution, under the condition that the standard deviations of the statistics for the respective random variables are unknown, the decision rule may be stated in terms of the t value according to the following equations:

$$t \frac{\overline{T}_E(i,j) - \overline{T}_N(i,j)}{S} \quad (13)$$

$$(9)$$

and $$S = \sqrt{\frac{(I_E - 1)s_E^2 + (I_N - 1)s_N^2}{(I_E + I_N - 2)} * \left(\frac{1}{I_E} + \frac{1}{I_N}\right)} \quad (14)$$

$$s_E = \sqrt{\frac{\Sigma [T_E(i,j) - \overline{T}_E(i,j)]^2}{I_E}} \quad (15)$$

$$s_N = \sqrt{\frac{\Sigma [T_N(i,j) - \overline{T}_N(i,j)]^2}{I_N}} \quad (16)$$

Where:

t=The Student t-Distribution, or t-Distribution, test statistic;

$S_E$=Standard Deviation of Expert users $S_N$=Standard Deviation of Novice users S=Standard Error of the Difference Between Means $I_N$=Total number of Novice users $I_E$=Total number of Expert users and generally, the subscripts "E" and "N" refer to Expert and Novice, respectively.

Thus, using these equations, the t-Distribution value is calculated using the recorded values for the Expert and Novice users.

In step 555, this t-Distribution value is used to provide a quantitative output of the usability performance of the system. For instance, if a predetermined confidence level is the basis for the decision, the t-Distribution value is compared to the acceptable range. For example, for the 5% significance level and twelve degrees of freedom discussed above, if the t-Distribution value were greater than −2.18 and less than 2.18, then the hypothesis would be accepted, and the system's usability would be rated for a 5% confidence level of acceptance. If the t-Distribution value did not fall within this range, the system's usability would not be rated highly for a 5% confidence level of acceptance, i.e., the H(0) Hypothesis is rejected. It is understood that once a t-Distribution value is calculated, the confidence level can then be determined according to the t-Distribution, and therefore, that the Usability Performance Method may provide a confidence level of acceptance value as an output that ranges anywhere between 0 and 1 (or, in percentage notation, between 0% and 100%). Alternatively, rather than provide a continuum of confidence levels, the confidence level range may be subdivided (i.e., quantized) into various intervals that are deemed to be indicative of meaningful distinctions in the confidence level. For instance, in the foregoing example, a single confidence level cutoff value (e.g., 5%) is used.

It may be appreciated, therefore, that the Usability Performance Method of the present invention provides a quantitative measure of the usability performance of a system. That is, the confidence level is a quantitative assessment of the usability of a system based on the time required to perform selected tasks, which reflects the required Perceptual, Cognitive, and Motor Skills of an individual operating a system. In effect, the confidence level quantitatively indicates how "intuitive", or "natural" a system is from a users perspective, and thus quantitatively indicates the "user friendliness" of the system, and concomitantly, it indicates the relative difficulty in learning and proficiently using the system.

It should be noted that by applying the Power Law of Practice methodology to the Human-Machine System principle, the usability analysis is performed without requiring more than one trial by each Novice user. Such an approach, as opposed to comparing a measured performance times for both Novice and Expert users for an arbitrary trial, eliminates factors (e.g., improvements in subsequent trials due to learning and other environmental factors) other than those germane to measuring usability. In addition, although the mean value for the first Expert trial may be statistically compared to the mean value of the first Novice trial (i.e., not applying the Power Law of Practice and avoiding learning and environmental factors), based on Human Factors Engineering principles it is preferable with respect to reliability and significance of the results to use the performance times that are measured for an Expert population after the Expert population has performed several trials (note that learning is not a factor for the Expert population). It can be understood that the Power Law of Practice may be applied to the Expert population results as well in order to estimate a mean performance time value for a "j" trial value greater than the number of trials that were performed. However, it is preferable to use an actually measured mean performance time value for the Expert population for a trial subsequent to the first trial.

Usability Performance Indicators Method

In accordance with a preferred embodiment of the present invention, a usability performance indicator method is included as part of the overall usability method. Usability Performance Indicators provide a quantitative evaluation of a system's usability in four key areas: Goal Achievement, Work Rate, and Operability.

These indicators primarily measure the level of a systems user's performance, e.g. effectiveness, efficiency, productivity, ability, willingness. As described hereinabove, Goal Achievement Usability Indicators measure the degree of success with which systems users perform their tasks and reach their goals. They measure the effectiveness of users operating systems and achieving their objectives.

Work Rate Usability Indicators measure the rate at which systems users perform to reach their objectives. They measure the efficiency and productivity of users operations to perform their tasks.

Operability Indicators measure the ability of system users to utilize the systems features. They measure the capabilities of systems users in making use of their experience, tools, and features to solve their systems problems. They also measure the level of problems users encounter while performing their jobs.

These indicators (Rengger, R. E., 1991, Measuring System Usability, *Proceeding of the 8th International Conference on Systems Engineering*, Conventry, United Kingdom) assist the measuring effectiveness, efficiency, productivity and other highly important usability indicators. In accordance with an embodiment of the present invention, the following indicators may be employed.

Goal Achievement Usability Indicators $$NE = \frac{1}{100} (QU * QL) \qquad (17)$$

$$EE = \frac{1}{100} (QU * QL) \qquad (18)$$

Where:
QU=Required inputting steps or information (e.g., pages, signals, screens, production units, pulses, etc.) during performance of a task, i.e., quantity of steps input by a user.
QL=Number of quality steps required to perform a task
EE=Expert user effectiveness
NE=Novice user effectiveness It is understood that in order to accomplish a particular task, or series of tasks, a certain number of steps are necessary (e.g., as prescribed by a user manual). This number of steps is represented by QL. Notably, QL for a Novice may be greater than QL for an Expert because an Expert may have knowledge about the system which allows the Expert to perform the task with fewer steps than may be prescribed by a manual, for example. Ideally a user will perform these steps in succession, performing no additional steps, and concomitantly, making no errors in performing a step. However, due to problems or errors, a Novice or an Expert using the system to accomplish a task will perform QU number of the required steps. For instance, a Novice may request help (constituting a step), or may undertake one or more steps that are not required or may be completely extraneous. It is understood then, that QU is generally greater than QL, and that the optimum effectiveness occurs when QU is equal to QL, corresponding to a minimum value of NE or EE.

Work Rate Usability Indicators $$RE = \frac{NE}{EE} * \frac{NT}{ET} \qquad (19)$$

$$PP = \frac{NT - PT_t - LT}{NT} \qquad (20)$$

$$PT_t = QU_t - QL_t \qquad (21)$$

Where:
$QL_t$=Time required for a Novice or an Expert to complete the required number of steps in the task, i.e., perform all QL steps;
$QU_t$=Time required for an Novice or an Expert to complete the task, i.e., perform all QU steps;
$PT_t$=Problem Time: the time period a Novice user spends performing steps not required for performing the task, i.e., $QU_t$ and $QL_t$ are for a Novice;
NT=Novice user task time (e.g., equivalent to $QU_t$ for a Novice)

ET=Expert user task time (e.g., equivalent to $QU_t$ for an Expert)

PP=Novice user productivity period

LT=Novice user learning time

RE=Relative efficiency of a Novice user in comparison to an Expert user

It is understood that the relative efficiency represents the ratio between a Novice user efficiency and an Expert user efficiency, where the efficiency is defined as an effectiveness-time product (e.g., EE*ET) and thus, the value of RE is greater than or equal to one, with a value of one indicating the system is ideal with respect to work rate usability, i.e., a Novice can effectively perform a task in the same amount of time as an Expert performing the same task. Also, the Novice user productivity period, PP, represents the fraction of the total Novice user task time that actually is spent by the Novice user in performing steps that achieve the task. In this respect, the learning time represents any time required for the Novice become familiar with the system in order to perform the task. Also note that it may be desirable to present these indicators in percentage form.

Operability Indicators $$RT = \frac{PT}{ET} = \frac{QU - QL}{NT} \quad (22)$$

$$RU = \frac{PU}{NA} \quad (23)$$

$$RL = \frac{PT - UP}{PT} \quad (24)$$

$$CF = \frac{CA}{NA} + \frac{LT + TP}{NT} \quad (25)$$

Where:

RT=Relative number of Novice user problems per unit of time

RU=Relative number of Novice user problems per unit of task

PT=Number of Novice user problems encountered

PU=Number of Novice user problems per unit of task

NA=Number of actions Novice user has undertaken to complete a task

RL=Problem recovery level for a Novice user

UP=Number of unsolved problems a Novice user has encountered during Novice task time CF=Complexity factor of the Novice user CA=Number of calls for assistance a Novice user made during Novice task time TP=Novice user problem time (e.g., $PT_t$ for a Novice)

In accordance with Operability Indicators measuring the ability of users to utilize the system features, it may be understood that, as defined, the RT indicator measures the ratio between the additional steps a Novice user performs that are not required for performing a task and the time required by a Novice to complete the task. Alternatively, such an indicator may be represented by the ratio of $PT_t$ to ET, i.e., fraction of time spent on problems. Note that for RU, which is the number of problems encountered per number of actions taken, NA in many instances is equivalent to QU, depending how tasks and actions are defined. That is, an "action" may be defined for convenience based on the system analyzed: an "action" may be defined as a number of tasks; alternatively, a task may be defined as multiple actions; or an "action" may be the equivalent of a "task". Using two variables QL and NA emphasizes that the indicators may be defined for convenience of analysis. Also note, that the number of problems encountered may be include any combination of the following: the number of times a user requested help, the number of times a user perceived that a problem was at hand, the number of times a user suspended activity for greater than a predetermined period of time, the number of extraneous steps executed on the system, etc.

It may also be understood that the recovery rate, RL, represents the fraction of problems encountered that the Novice user successfully solved or overcame. In addition, the complexity factor provides an index of the overall difficulty in using the system based on the relative number of calls for assistance and the relative amount of time spent learning the system and addressing problems encountered as opposed to the time performing steps to complete the task. Finally, it may be desirable to present these Operability Indicators in percentage form.

It is understood that the foregoing usability performance indicators are merely illustrative of the indicators that may be employed in accordance with measuring the performance (e.g., time, number of steps) of a given task. In addition, indicators may be derived as functions of the above indicators. For example, since it is useful to compare NE to EE for a given task, it may be preferable to define a relative effectiveness as the ratio of NE to EE. It is noted that the usability model of the present invention preferably includes the indicators associated with the Usability Performance Indicators Method; however, since each of the methods disclosed herein (i.e., Usability Satisfaction Method, Usability Performance Method, and Usability Performance Indicators Method) provides complementary and independent quantitative usability information, it may not be necessary to include the Usability Performance Indicators Methodology as part of the overall usability method. Nevertheless, since much of the data needed to provide these indicators is acquired in accordance with the Usability Performance Method, determining the indicators requires little additional effort. Moreover, as stated, these indicators provide complementary analytical information.

With the present usability method, as described above, system usability is quantitatively measured in accordance with three complementary methods. Such a usability methodology will effectively enhance re-engineering efforts. In addition, the methodology provides a diagnostic information process for root cause evaluations of a system's usability, assesses or ranks a system's capabilities to meet its purported objectives, and identifies appropriate courses of action for current problem areas as well as those problem areas that may be encountered during future development. Results achieved by using this methodology are quantitative, cross-platform, applicable, cost effective, repeatable, consistent and easily validated.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope.

For example, with respect to the Usability Satisfaction Method, as described above, in accordance with the present invention there are numerous ways to categorize and represent the user sampled critical factor data. Further, in the Usability Performance Method, different methodologies may be used for representing practice by individual. Also, in appropriate circumstances, a different test statistic or even different population statistics may be employed. Moreover, many different combinations of the above described usability indicators, as well as additionally defined indicators, may be used.

These and other changes can be made without departing from the spirit and the scope of the invention and without diminishing its attendant advantages. It is therefore intended that the present invention is not limited to the disclosed embodiments but should be defined in accordance with the claims which follow.

I claim:

1. A method for operating a computer to provide a quantitative usability measure for evaluating usability of a system, said system including a process, product, or manufacturing procedure and having means for performing a task, said task including at least one step, said method comprising the computer executed steps of:

measuring first time value signals for each member of an Expert population to perform said task on each of a plurality of trials;

measuring second time value signals for each member of a Novice population to perform said task on each of at least one trial;

estimating, according to a predetermined relationship, a mean time for said Novice population to perform said task on a future trial;

comparing a mean time for said Expert population to perform said task on a trial equivalent in number of trials to said future trial with said mean time for said Novice population to generate a statistical index indicating a significance of the difference therebetween; and providing said quantitative usability measure as a function of said statistical index.

2. The method according to claim 1, wherein said predetermined relationship is based on a Power Law of Practice relationship.

3. The method according to claim 1, wherein said comparing step includes generating a Student t-Distribution test statistic for said Expert population and said Novice population, wherein said statistical index is based on a significance level corresponding to said Student t-Distribution test statistic.

4. The method according to claim 1, further comprising the steps of:

identifying critical factors for said system;

identifying at least one bipolar adjective pair for each critical factor, said bipolar adjective pair consisting of a positive adjective and a negative adjective having opposite semantic meaning;

acquiring adjective pair data from each member of a system user population for each said bipolar adjective pair, said adjective pair data for each bipolar adjective pair having a numerical value within a range bounded by a value assigned to said positive adjective and a value assigned to said negative adjective and linearly related to the positive adjective relative to the negative adjective in characterizing said critical factor according to the member;

acquiring significance data from each member of said system user population for each said critical factor, said significance data numerically representing the relative significance of said critical factor according to the member; and generating a usability satisfaction value according to said adjective pair data and said significance data.

5. The method according to claim 4, wherein said usability satisfaction value represents the satisfaction of a group of users with respect to a given critical factor.

6. The method according to claim 4, wherein said usability satisfaction value represents the satisfaction of a given user with respect to a set of critical factors.

7. The method according to claim 4, wherein said usability satisfaction value includes, for at least one of said critical factors, a product of a sum of said adjective pair data and said significance data.

8. The method according to claim 7, wherein said usability satisfaction value includes a sum of said product for each critical factor for a given user.

9. The method according to claim 7, wherein said usability satisfaction value includes a sum of said product for each user for a given critical factor.

10. The method according to claim 4, further comprising the step of generating at least one Usability Performance Indicator according to measured parameters.

11. The method according to claim 10, wherein said measured parameters include performance time and number of steps performed for completing said task.

12. The method according to claim 10, wherein said Usability Performance Indicator is selected from the group of Goal Achievement Indicator, Work Rate Indicator, and Operability Indicator.

13. The method according to claim 1, further comprising the steps of generating at least one Usability Performance Indicator according to measured parameters.

14. The method according to claim 13, wherein said at least one Usability Performance Indicator is selected from a group of indicators including a Novice user effectiveness, and a Relative Efficiency of a Novice user to an Expert user.

15. The method according to claim 14, wherein said Usability Performance Indicator is selected from the group of Usability Goal Achievement Indicator, Usability Work Rate Indicator, and Usability Operability Indicator.

16. The method according to claim 1, wherein said system is a computer system.

17. The method according to claim 1, wherein said quantitative usability measure equals said statistical index.

18. A method for operating a computer to provide a quantitative usability measure for quantitatively evaluating usability of a system, comprising the computer executed steps of:

acquiring first data for providing a usability satisfaction measure according to a set of critical factors of said system;

measuring second data for providing a usability performance measure according to the difference between a measured performance time for an Expert population to perform a task on a given trial and an estimated performance time for a Novice population to perform the task on the given trial;

measuring third data for providing a Usability Performance Indicator; and processing said first, second, and third data to provide quantitative values for said usability satisfaction, said usability performance, and said Usability Performance Indicator.

* * * * *